United States Patent [19]

Johansson

[11] Patent Number: 4,738,353

[45] Date of Patent: Apr. 19, 1988

[54] BELT CONVEYOR SYSTEM

[76] Inventor: Rolf Johansson, Blombergsvägen 5, S-702 30 Örebro, Sweden

[21] Appl. No.: 923,145
[22] PCT Filed: Feb. 13, 1986
[86] PCT No.: PCT/SE86/00058
  § 371 Date: Oct. 14, 1986
  § 102(e) Date: Oct. 14, 1986
[87] PCT Pub. No.: WO86/04882
  PCT Pub. Date: Aug. 28, 1986

[30] Foreign Application Priority Data

Feb. 14, 1985 [SE] Sweden .................. 8500683

[51] Int. Cl.$^4$ ............................ B65G 15/10
[52] U.S. Cl. ................... 198/817; 198/840; 198/842; 198/836; 198/861.1
[58] Field of Search .......... 198/840, 842, 837, 817, 198/836, 861.1

[56] References Cited

U.S. PATENT DOCUMENTS

| | | | |
|---|---|---|---|
| 2,573,486 | 10/1951 | Pollitz | 198/842 |
| 2,698,079 | 12/1954 | Wearly | 198/840 X |
| 2,705,854 | 4/1955 | Laverdisse | 198/840 X |
| 3,225,902 | 12/1965 | Roinestad | 198/842 X |
| 3,598,226 | 8/1971 | Hayman | 198/817 |
| 4,013,165 | 3/1977 | Bush | 198/817 |
| 4,274,529 | 6/1981 | Mori et al. | 198/817 X |
| 4,366,900 | 1/1983 | Johansson | 198/817 X |

FOREIGN PATENT DOCUMENTS 888059 1/1962 United Kingdom.

Primary Examiner—L. J. Paperner
Assistant Examiner—D. Glenn Dayoan
Attorney, Agent, or Firm—Dennison, Meserole, Pollack & Scheiner

[57] ABSTRACT

In belt conveyors having two parallel belts (1) with feeders, movement of the belts must be synchronized. The known method of achieving this is by means of electrical systems. The present invention entails a radical simplification of this synchronization by using a single belt (1) crossing over below the conveyor, the two parallel sections on the upper side of the conveyor thus moving synchronously. The conveyor according to the invention is less expensive and more reliable than previously known conveyors, nor is it dependent on a source of electric power.

9 Claims, 7 Drawing Sheets

BELT CONVEYOR SYSTEM

The present invention relates to means in belt conveyors, primarily intended to achieve synchronization of the belt.

The invention is preferably intended for use in light conveyors having two belts running in parallel. Such a conveyor has such low weight that it can be moved and erected in working position by one or at most two men.

BRIEF DESCRIPTION OF THE DRAWINGS

Such a patented conveyor will be described with reference to the accompanying drawings in which:

FIG. 1 shows the conveyor from the side. For the sake of clarity the figure has been cut and contracted. The figure thus falls into three divisions: the ends 1 and 3 and the middle part 2. Various components have been denoted by A, B, C and so on. The conveyor is constructed around the central body I, consisting of the three parts which can be telescoped into each other to facilitate transport from one site to another. When extended, the three parts are locked in relation to each other with the aid of pins or bolts 2B.

Figure 2:
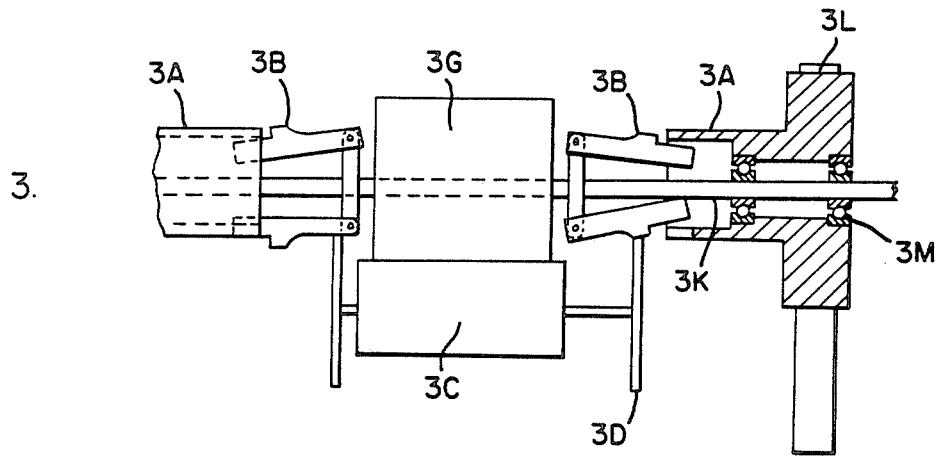
FIG. 2 shows the conveyor seen from above.
Figure 2:
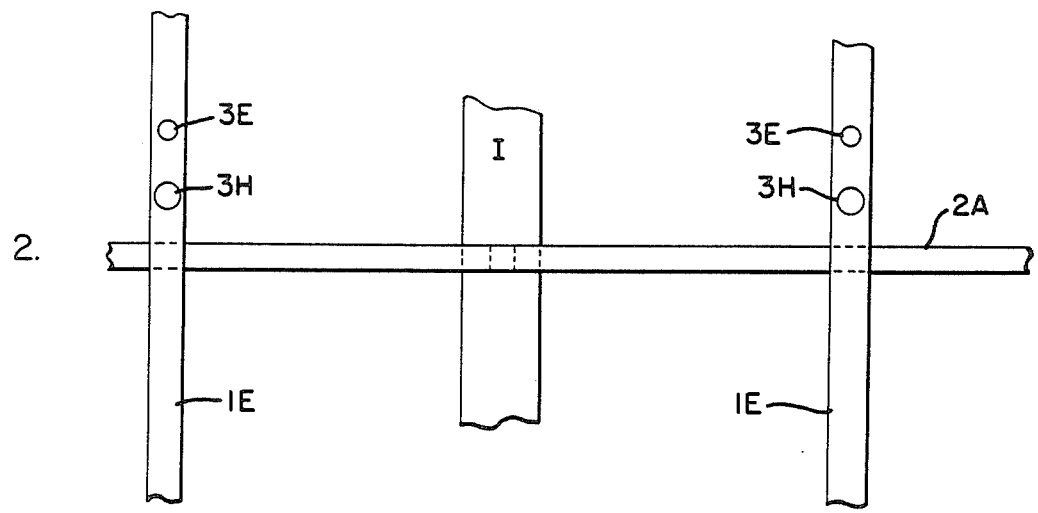
Figure 2:
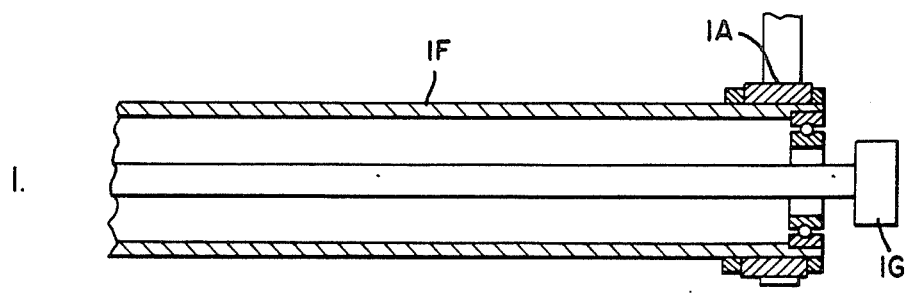

As can also be seen from FIG. 2, two parallel belts 1E run over guide rollers 1F and 3L at the ends of the conveyor. To enable driving of the belts, the guide roller 1F, which is not driven, is arranged on a bracket 1G located on a pipe 1B protruding into the body I. With the aid of a screw 1D running in a nut 1C in the body, the bracket 1G can be moved in one direction or the other. Other brackets 2C with support rollers 2A for the upper sections of the belts are provided at suitable intervals along the body. A number of feeders 3H are also provided on the belts 1E to feed the load units along. These feeders may be in the form of very simple rubber studs or the like. The belts may consist of strong, relatively narrow strips or nylon, for instance, some five to ten cemtimeters in width.

Figure 1:
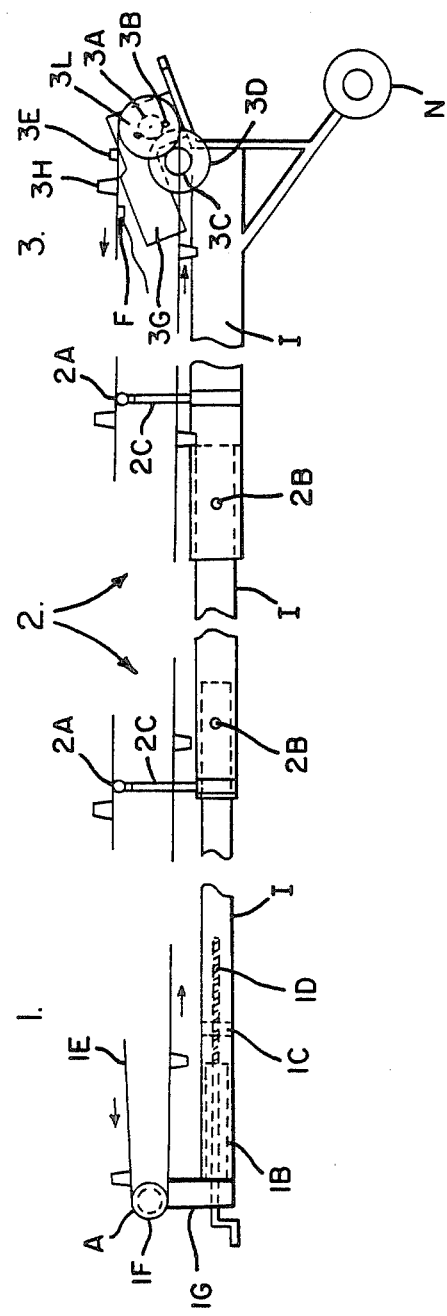
FIG. 1 shows a conveyor according to the invention seen from the side.

The belts are driven by guide rollers 3L at the right-hand end of FIG. 1. These guide rollers are in turn driven by a motor 3G with suitable ratio. The guide rollers are located on the driving shaft 3K from the motor but can rotate quite freely thanks to ball-bearings 3M. They are driven individually by one of the jaws 3B in a jaw clutch, the other part of which is in a cylindrical sleeve 3a on the guide roller 3L. The principle can be seen more clearly in FIG. 3 showing an axial view of the connection.

Figure 3:
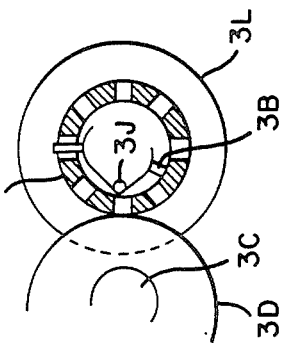
FIG. 3 shows an axial view of a connection according to FIG. 2.

As is evident from FIGS. 2 and 3, the sleeve 3A is divided into a number of teeth between which the jaws 3B can engage. The jaws are located on a transverse arm secured to the driving shaft 3K. The jaws 3B are also located in relation to each other and to the pitch of the teeth in the sleeve 3A so that only one jaw can engaged between these teeth at a time. A spring 3J between the jaws presses these apart from each other and in between the teeth.

The jaw clutches are controlled by a double-acting electromagnet 3C whose armature on the ends is provided with circular discs 3D. When the armature is driven in one direction or the other, one of these discs will influence keepers on the jaws 3B which are thus forced out of engagement with the teeth on the sleeve 3A. The magnet 3C is controlled by indicators 3E on the belts 1E. These indicators may consist of small permanent magnets fitted equidistant from feeders 3H on the belts. It is thus possible to determine whether the feeders on the two belts remain immediately opposite each other.

Obviously this can never be the case since it is impossible to manufacture the guide rollers 3L so exactly alike that the two belts always move exactly synchronously. However, by momentarily releasing one or the other of the jaw clutches 3A, 3B, the corresponding belt can be stopped briefly until the other belt catches up. This is achieved by the indicators 3E influencing the magnetic contacts 3F located somewhere on the body I where they will be passed by the indicators.

It can also be seen in FIG. 1 that the conveyor can be provided with wheels N at one end, to facilitate transport.

The objective of the present invention, as with the belt conveyor described above, is to achieve synchronized movement of the parts of the belt moving in parallel. However, it differs in that synchronization is achieved by the use of a single belt which is permitted to cross over. The entire construction is thus greatly simplified while ensuring high reliability.

Figure 4:
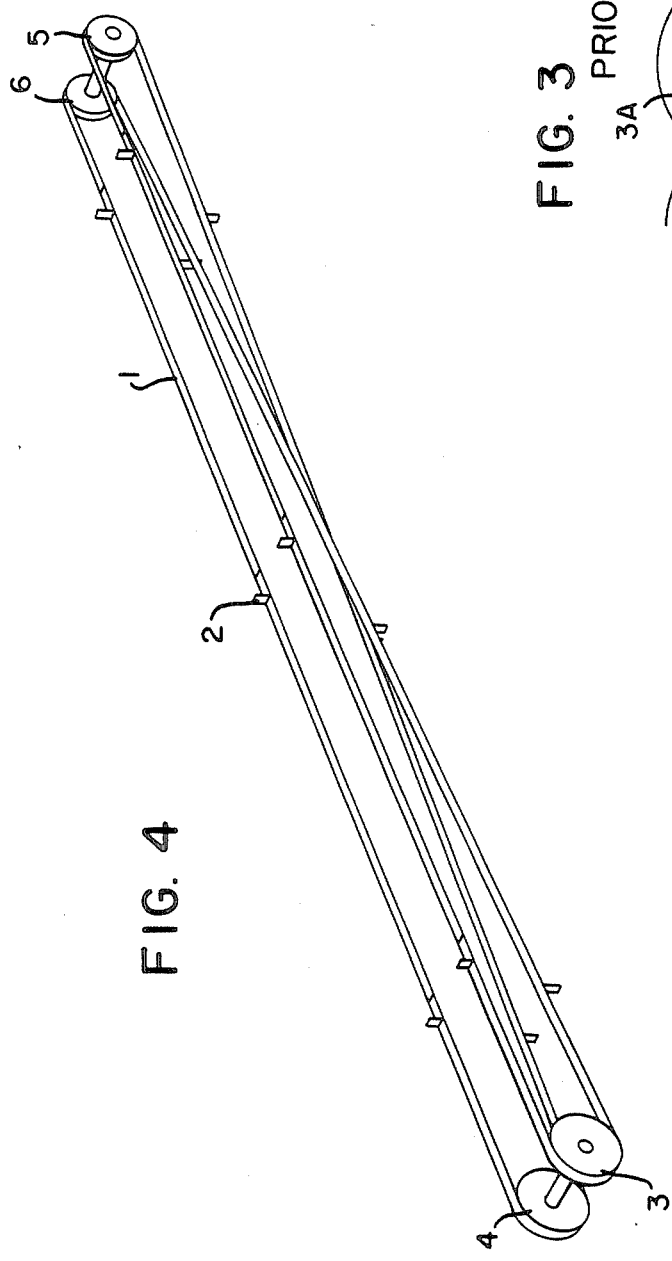
FIG. 4 shows the arrangement of the belt.
Figure 5:
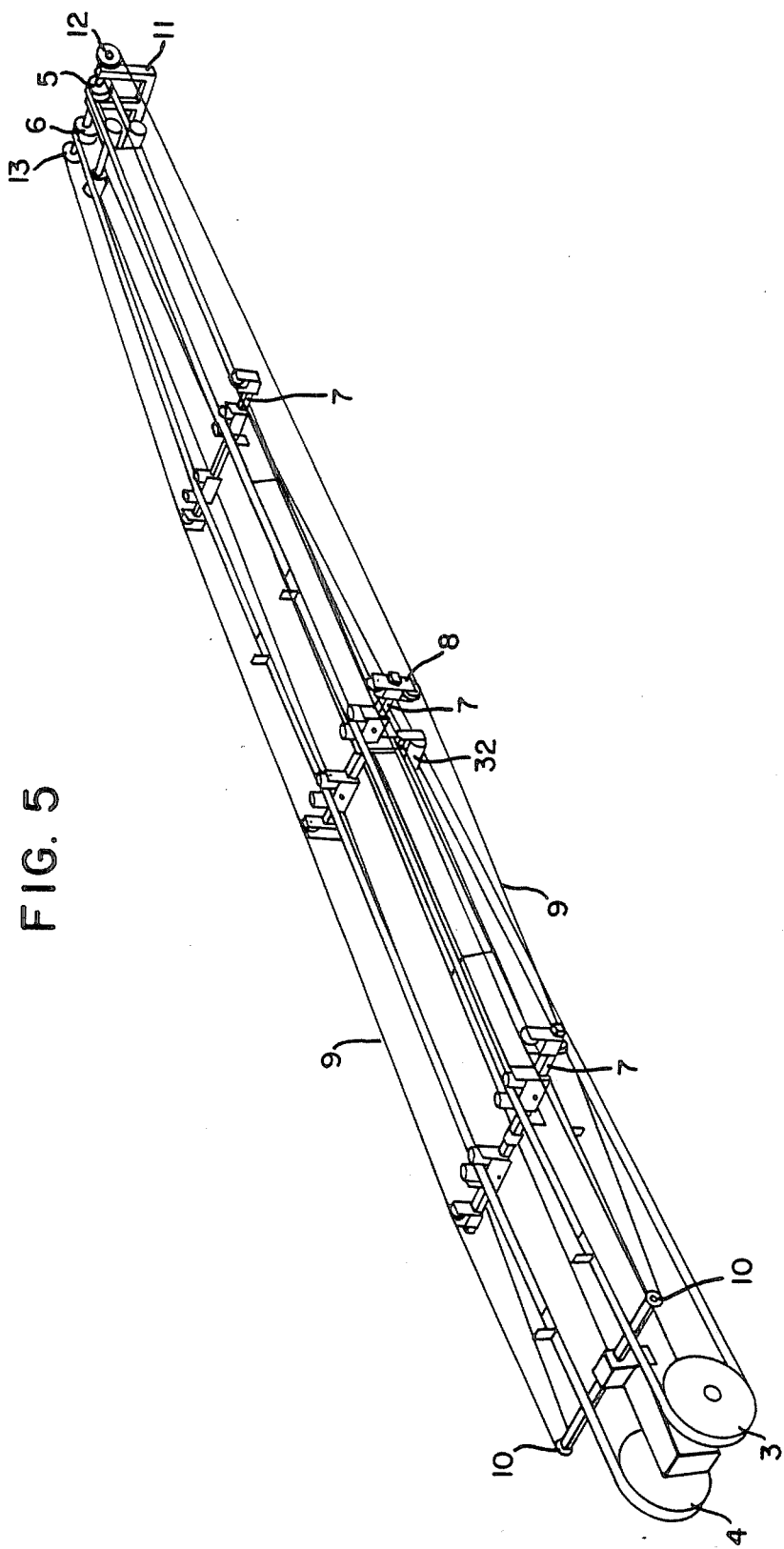
FIG. 5 gives a more complete picture of the belt and support cables.

In the FIGS. 1 denotes a belt with feeders 2. As can be seen in FIGS. 4-5, the belt 1 is crossed on the lower side of the conveyor. The two parallel sections of the belt on the upper side are thus synchronized. The belt 1 is driven by driing rollers 3-4 and runs over guide rollers 5-6.

Supports 7 are arranged for support rollers. The support rollers 8 are intended to hold down the cables 9. Several rollers 8 may be arranged. The cables 9 are intended to support particularly wide loads. They are driven by the load alone and run over guide pulleys 10. FIG. 5 shows three supports 7, but either two or more than three supports are also feasible.

A frame 11 for guide wheels 5-6 is arranged at the far end of the conveyor, and this frame 11 is also provided with guide pulleys 12-13 for the cables 9. These are on the same shaft as the rollers 5-6.

Figure 6:
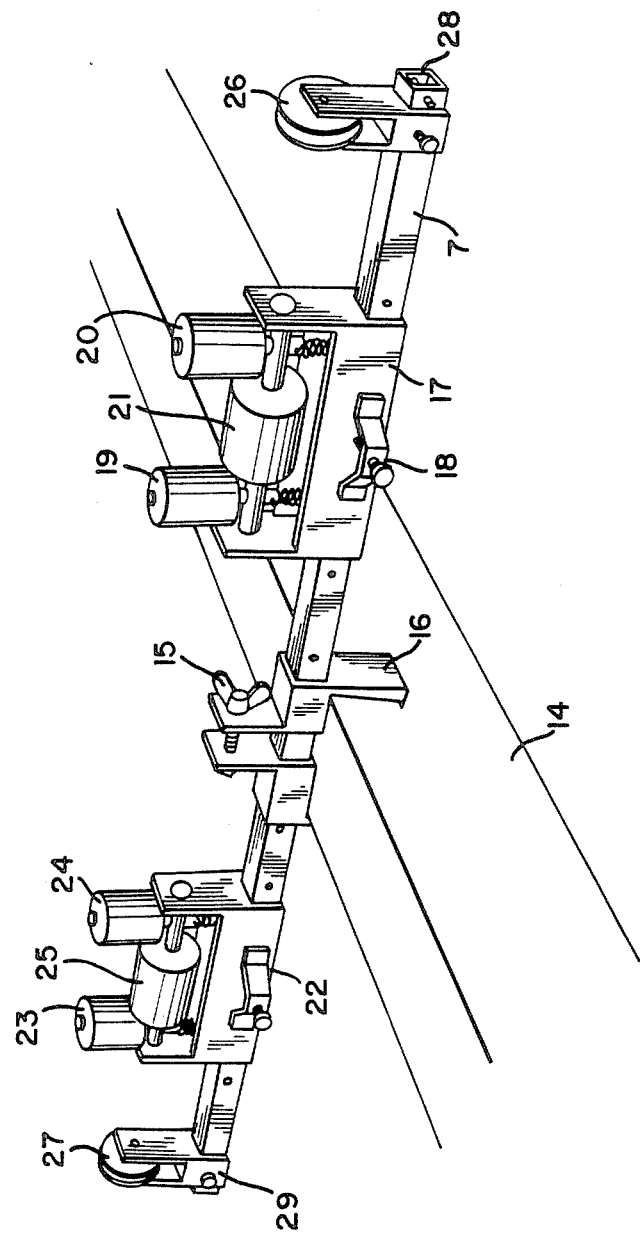
FIG. 6 shows the system with support rollers.

FIG. 6 shows the support 7 in more detail. The stand is clamped on a beam 14 by means of a wing nut 15. It can thus be displaced along the beam 14. A jaw 16, thicker at its lower end is used for clamping the stand. A holder 17 for support rollers can be moved laterally along the support 7 by means of a screw 18 or spring clamps.

The holder 17 carries two vertical support rollers 19-20 and one horizontal support roller 21 for the belt 1. The vertical rollers 19-20 are spring-loaded. A similar holder 22 on the other side of the beam has support rollers 23-24 and 25, respectively. Pulleys 26-27 for support cables are provided at the ends of the support 7, and stops 28-29 outermost.

Figure 7:
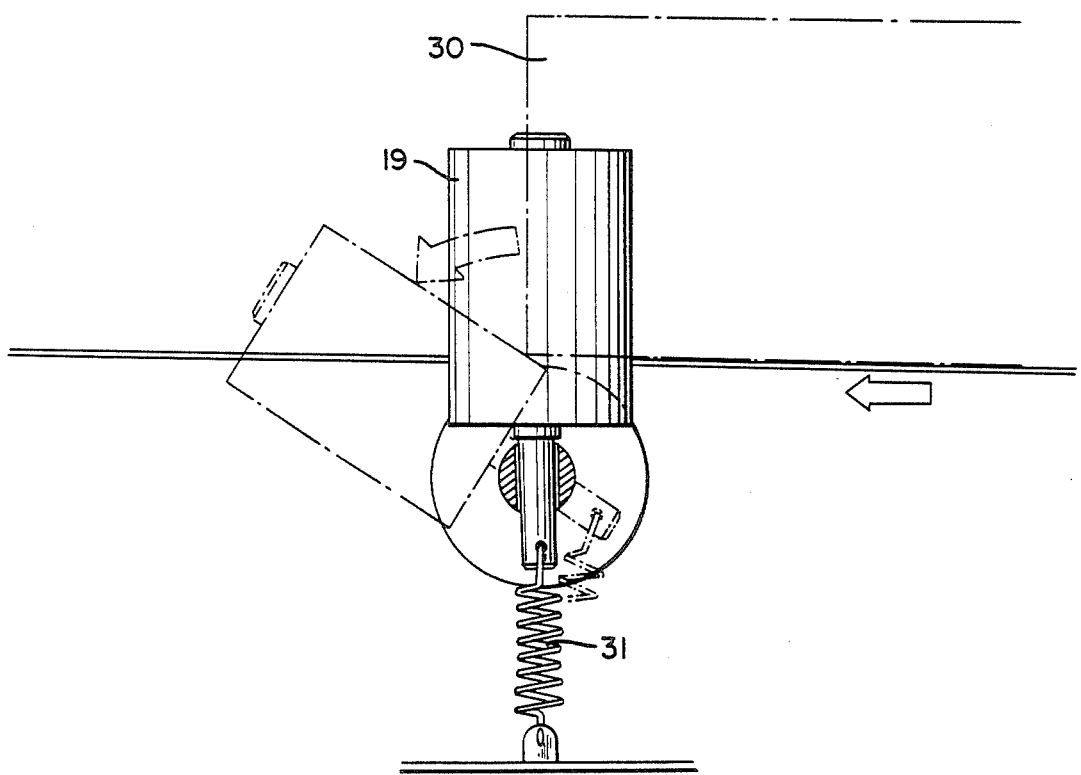
FIG. 7 shows a detail of a critically positioned support roller.

FIG. 7 shows a detail of the support rollers on the holder 17. Thanks to the spring 31, the vertical rollers 19-20 can be tilted to allow the load 30 to pass.

Figure 8:
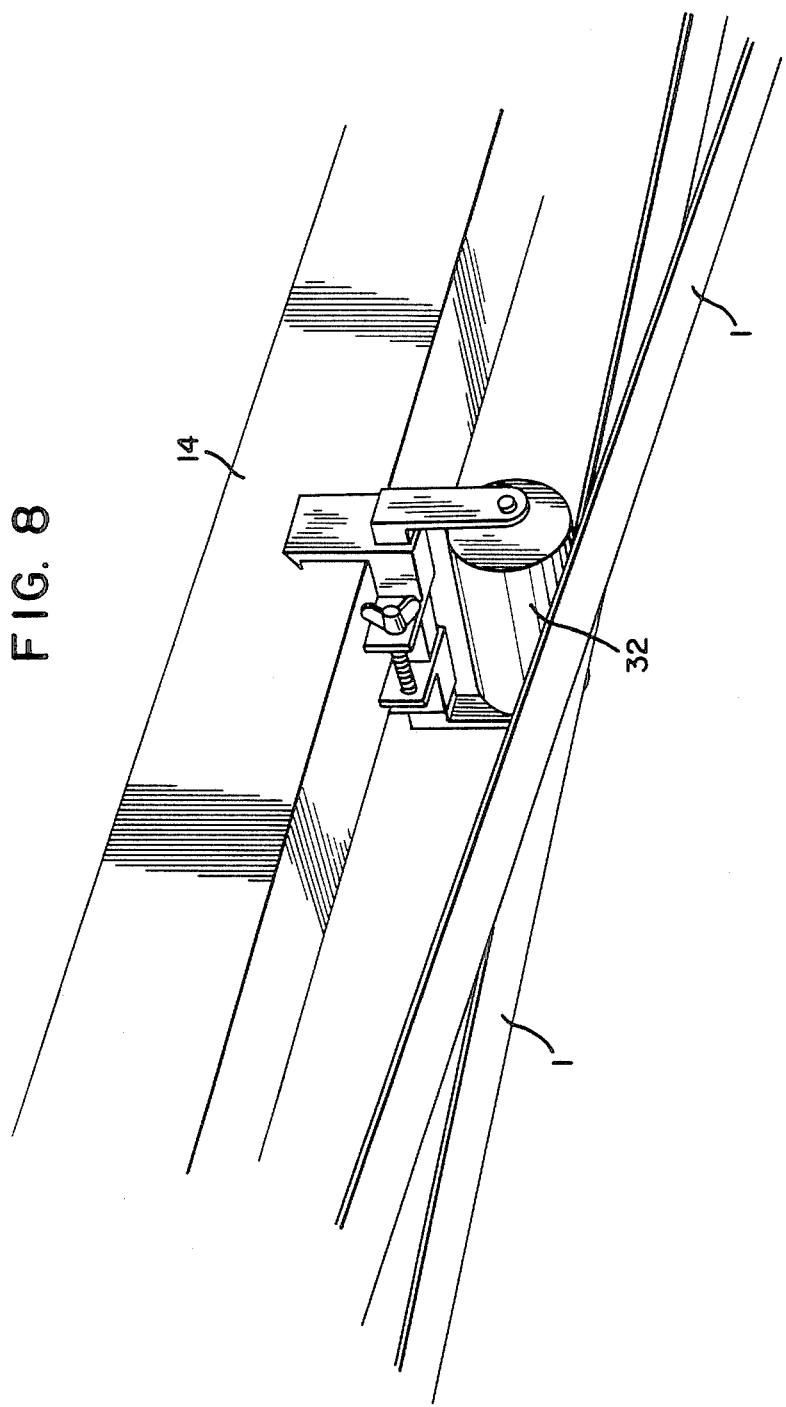
FIG. 8 shows a detail of a support roller located on top of the belt at the crossing.

A lower support wheel 32 is also arranged on the support 7, at the point when the belt crosses. The belt runs below the support roller 32, as shown in FIG. 8. This arrangement enables the belt to be run in both directions to achieve separation. The support roller 32 is sufficiently wide for the two sections of belt to run adjacently. The feeders will separate when the belt has passed the support roller 32.

If necessary the support roller 32 may be provided with edge flanges to prevent the belt 1 from slipping off.

The invention eliminates the need for electrical or mechanical systems for synchronization and thus also access to a source of electric power, thus offering free choice. This is of course important in the building branch. The risk of accidents caused by mal-function of the synchronization system is also eliminated.

Furthermore, the drive rollers need not be exactly the same diameter. Minor differences in diameter will automatically be adjusted after a while, due to wear. Neither are two identical belts necessary.

What is claimed is:

1. A belt conveyor with dual upper and lower runs for roof tiles or the like, said conveyor comprising an elongate fixed central body, a conveyor belt, belt drive rollers on said fixed body and belt guide rollers on the fixed body remote from the drive rollers, said drive rollers and said guide rollers defining opposed ends of the conveyor, said belt being a single continuous belt defining the dual upper runs and the dual lower runs, each of said runs extending linearly for the length of the conveyor between a drive roller and a guide roller, the lower runs crossing each other with the upper runs extending parallel to each other, one on each side of the fixed body, said runs moving synchronously during operation.

2. A belt conveyor according to claim 1, characterized in that the conveyor is provided with at least one support (7) carrying holders (17,22) for support rollers (19-21, 23-25) for the belt (1), one holder (17,22) on each side of the central body.

3. A belt conveyor according to claim 2, characterised in that the support (7) is displaceable along the fixed, central body, said body comprising of a beam (14).

4. A belt conveyor according to claim 3, characterised in that the holders (17,22) are displaceable laterally along the support (7).

5. A belt conveyor according to claim 4, wherein said support rollers comprise two vertical rollers (19-20, 23-24) and one horizontal roller (21,25) arranged on each side of the central body, on the holders (17,22).

6. A belt conveyor according to claim 5, characterised in that the vertical support rollers (19-20, 23-24) are spring-loaded and can be folded down to allow the load past.

7. A belt conveyor according to claim 6, characterised in that a support roller (32) is arranged below the central body at the point at which the lower runs cross, the belt lower runs passing below the support roller (32).

8. A belt conveyor according to claim 7, characterised in that cables 9 are arranged at the outer edges of the conveyor to support wide loads.

9. A belt conveyor according to claim 8, characterised in that the cables (9) run on guide pulleys (10, 12-13) and are held down by support rollers (8).

* * * * *